Patented Nov. 15, 1932

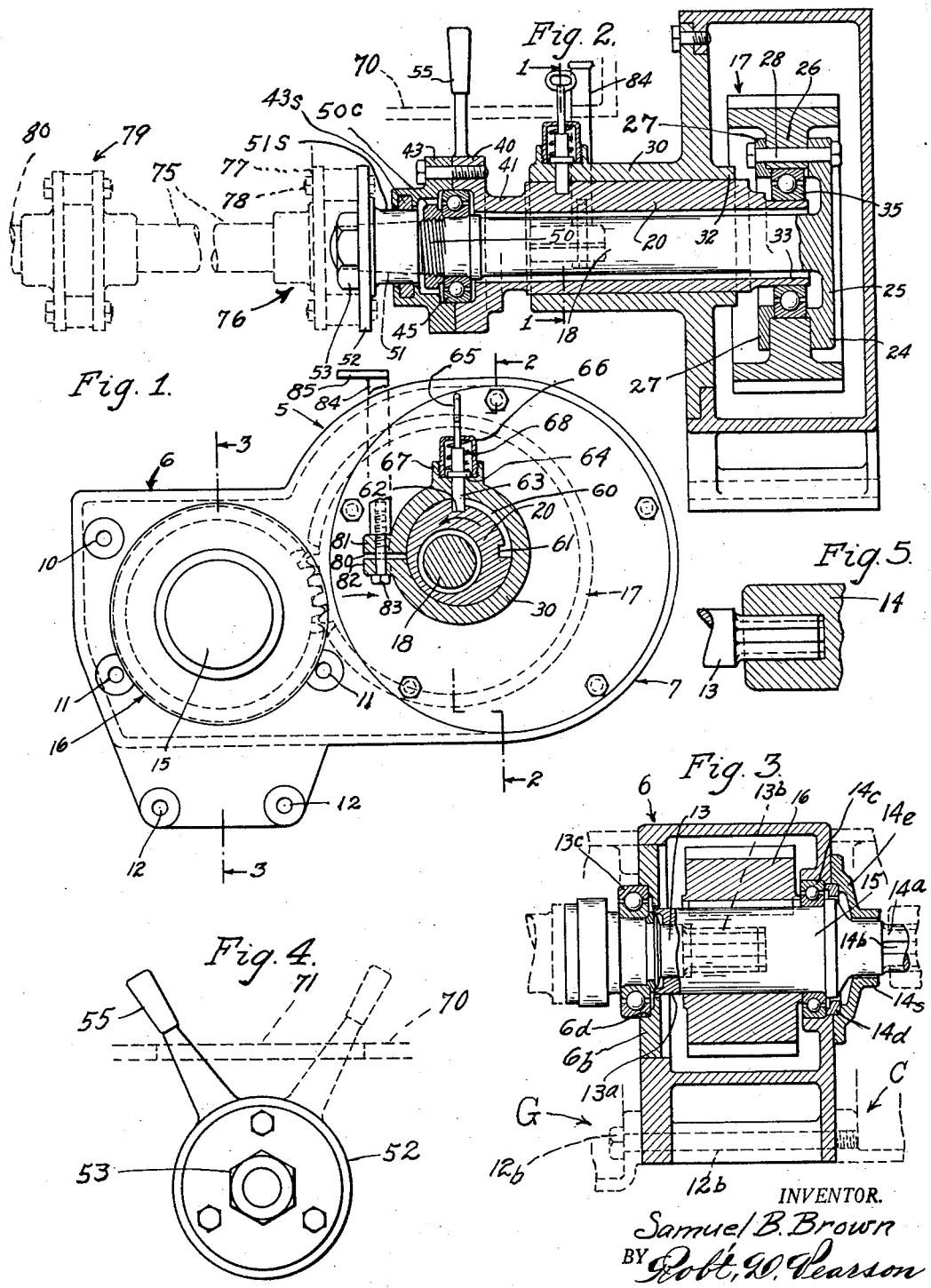

1,887,832

UNITED STATES PATENT OFFICE

SAMUEL B. BROWN, OF LOS ANGELES, CALIFORNIA

AUXILIARY POWER DEVICE

Application filed November 26, 1930. Serial No. 498,346.

This invention relates to an auxiliary power device adapted to be inserted within various kinds of power lines and adapted to supply power to operate various mechanical devices which are auxiliary to the main use for which the power line is intended.

The invention is more particularly intended to be attached to the power transmission of a self-propelled vehicle, but it is not limited to use in such a situation. When applied to a self-propelled vehicle it forms a convenient means for operating such a device as an orchard spraying apparatus, a hoist used for loading a dump truck, or for driving various other mechanical devices which may be mounted upon a vehicle and used in conjunction therewith.

An object of the invention is to provide a device of the character stated which may readily be applied to the transmission line of vehicles now on the market. In the drawing the device is shown, by way of example, attached to the Ford, model "A", type of transmission.

Other objects, advantages and features of the invention may hereinafter appear.

Referring to the accompanying drawing which illustrates what is at present deemed to be a preferred embodiment of the invention, Fig. 1 is a view of the attachment, partly in elevation and partly in section, the sectioned portion of the view being taken on line 1—1 of Fig. 2.

Fig. 2 is a vertical section on irregular line 2—2 of Fig. 1.

Fig. 3 is a vertical section on line 3—3 of Fig. 1.

Fig. 4 is a front end elevation of the device, the foot board through which the operating lever extends, being shown in section.

Fig. 5 is a fragmental view of the portion of the transmission line into which the device is inserted.

Referring in detail to the drawing, the device is provided with a casing 5 which, as viewed in Fig. 1, has an insertable polygonal portion 6 and a circular portion 7, the insertable portion being adapted for insertion between two parts of the transmission line which are to be separated from each other to provide for the insertion of said casing therebetween. Said casing portion 6 is provided with an end wall at each side through which extends the upper bolt hole 10, middle bolt holes 11, and lower bolt holes 12.

In Fig. 3, C designates the clutch side, and G the gear case side, of the Ford type "A" transmission in combination with which the invention is illustrated. In this view the bolt 12b, which passes through one of the bolt holes 12, is shown in dotted lines, it being understood that like bolts (not shown) pass through the bolt holes 10 and 11.

Although the power device provided by this invention is shown, by way of example, as positioned between the clutch and gear case, yet it is to be understood that it is not limited to use in such a situation, but may be installed in any other suitable place in the power line as, for example, between the motor and clutch. It is desirable to place the device in the latter position when the automobile engine is to be used to operate an auxiliary device while a vehicle equipped with the invention is standing still.

At the point where the device is inserted, the transmission line is shown provided on the gear case side with a male portion 13 and on the clutch side with a female portion 14 which portions are shown fluted together in a well known manner. In order to provide room for inserting the attachment these two portions are withdrawn from each other to a sufficient extent to provide for inserting a stub shaft 15 which has at the gear case side a female portion 13a and at the clutch side a male portion 14a adapted to fit over the corresponding male portion 13 and female portion 14. At the female end of the stub shaft 15 are provided splines 13b to unite rotatably that end of the stub shaft with the male portion 13 of the transmission line, while at the opposite end of the stub shaft 15 are provided splines 14b to unite the stub shaft rotatably with the female portion 14 of the transmission line. 13c designates a bearing construction which is a part of the structure to which the attachment is applied, and 14c designates an additional bearing construction which is applied near the male end of the stub shaft 15. To the stub shaft 15 is fixed a driving spur gear 16 which is contained within the insertable casing portion 6.

Said casing portion 6 is shown provided with an opening at the left side as viewed in Fig. 3, said opening being closed with a plate 6b after the parts are assembled. Said plate 6b is provided with a central circular recess 6d in its outer side which is arranged to aid in supporting the bearing construction 13c already referred to. At the right hand of the construction as it is shown in Fig. 3, there is provided a bearing retaining ring 14d which is held in place by the flanged end portion 14e of a sleeve 14s. When the bolts 12b, already referred to, are put in place thus holding the insertable casing portion 6 in proper position between the separated portions of the transmission line, the parts will all be held in proper operative relation.

With said spur gear 16 cooperates a driven gear 17 contained within the casing portion 7, said gear 17 being mounted upon an adjustable shaft 18 which is eccentrically mounted within the cam sleeve 20, whereby said gear 17 is rendered movable into and out of engagement with the gear 16.

By preference and as shown, the shaft 18 of the driven gear 17 is provided with a circular head 24 which is united to the end of said shaft by means of an end plate 25 made integral with the shaft and its said head. Said head is secured to the felloe 26 of gear 17 by means of a circular plate 27 and a series of bolts 28 which extend through said plate, felloe and head, one of these bolts being shown in Fig. 2.

The casing 7 is provided with a reduced annular extension 30 within which the eccentric sleeve 20 has its bearing. Said sleeve has its inner end provided with a reduced portion 33 which is engaged by the inner side of the ball bearing construction 35. Said ball bearing construction 35 fills in the annular space between the sleeve extension 33 and the felloe 26 of the gear 17.

The outer end of the eccentric sleeve 20 is provided with a head 40 which is connected to the sleeve by means of a reduced neck portion 41. To said head 40 is bolted a cap 43 and within said cap 43 and head 40 is mounted a ball bearing construction 45 within which the outer portion of the shaft 18 has a bearing.

Within the outer end of the cap 43 is a stuffing box 43s which is provided with a suitable filling in order to prevent dust or dirt from working around the collar 51s into the bearing 45.

The outer end portion 51 of shaft 18 is tapered and is provided with a screw-threaded portion 50 upon which is screwed a collar 50c to retain the ball bearing structure 45 in place. Over the tapered portion 51 is fitted a sleeve or collar 51s, the coupling flange 52 being formed on the outer end of collar 51s and preferably being integral with said collar. A securing nut 53 screws on to the outer end of shaft 18.

A means is provided to enable the operator to impart rotary movements to the eccentric sleeve 20 for the purpose of moving the driven gear 17 into and out of engagement with the driven gear or pinion 16. For this purpose said sleeve is provided at its outer end with a radial operating arm 55, which may be an operable lever.

Means are provided for limiting the rocking movement of the eccentric sleeve 20 and for locking said sleeve in each of the positions into which it may be rocked, that is to say, with the gears in mesh with each other or with them out of mesh. For this purpose a radial groove 60 is formed in the sleeve 20 there being at one end of said groove a seat 61 and in the other end thereof a like seat 62. Said groove 60 need not extend more than one-fourth the circumference of the sleeve 20. A retractile stop pin 63 is provided which extends radially through the annular extension 30 with a working fit, the inner end of said pin being adapted to seat in either the seat 61 or the seat 62. Said pin 63 has fixed thereto between its ends a collar 64, and at its outer end said pin is provided with a finger hold extension 65, which has a shank of less diameter than the body portion of the pin. The pin 63 is enclosed by a cap 66 which is screwed into an annular boss 67 with which the annular member 30 is provided. Around the upper portion of pin 63 is coiled a compression spring 68 the lower end of said spring engaging said collar 64, yieldingly to maintain the inner or lower end of pin 63 in engagement with the seat 61 or else the seat 62.

When it is desired to rock the sleeve 20 the operator grasps the finger hold 65 with one hand and withdraws the pin 63 from the seat 61 or else 62 which it normally engages, and then with the other hand he may operate the lever 55 and thus rock the eccentric sleeve 20 and move the gear 17 as desired. The upper end of pin 63 will strike against the top of cap 66 before the lower end of said pin can be completely withdrawn from the groove 60.

The operating lever 55 projects through the foot board 70, said foot board being indicated by dotted lines in Figs. 2 and 4, and in the latter view being shown provided with a slot 71 through which said lever extends.

In Fig. 1 are indicated in dotted lines two well known flexible joint assemblies 76 and 79 which are connected by means of a shaft 75 whereby power is transmitted from the device. The joint assembly 76 is shown provided with the usual collar 77 and bolts 78 and the assembly element 79 is preferably constructed in the same manner as the corresponding parts in the assembly 76. The shaft 80 is the final transmission element shown in the drawing.

In order to provide for regulating the frictional engagement between the eccentric sleeve 20 and the tubular casing extension 30 which forms a bearing for said sleeve, said tubular extension is shown split at one side as indicated at 80 there being a flange 81 provided above said split, and a flange 82 below said split, these flanges being provided with apertures in alinement with each other to receive a screw threaded tension bolt 83. Upon said bolt 83 is screwed an internally threaded sleeve or socketed member 84 having an operating handle 85 at its upper end. By this means a clamping device is provided whereby the eccentric sleeve 20 may be clamped friction-tight in any desired position, for example, at a position wherein the pin 63 will be located between the nuts 61 and 62.

I claim:

1. In an auxiliary power device, two shafts, one a stationed shaft and the other an adjustable shaft, a main support upon which said shafts are rotatably mounted, means to adjust the position of the adjustable shaft toward and from the other shaft while maintaining said shafts in parallel spaced relation to each other, a driving gear mounted on the stationed shaft, a driven gear fixed to said adjustable shaft, the aforesaid adjusting means serving to bring said gears into and out of mesh with each other, and a third shaft to be driven by said adjustable shaft.

2. In an auxiliary power device, a casing having a tubular extension, a sleeve turnably mounted within said extension, said sleeve having an eccentric bore therethrough, one end of said sleeve projecting outwardly beyond said tubular extension and the other end of the sleeve projecting inwardly therefrom to a point within said casing, the inner end of said sleeve having an extension which surrounds said bore and together therewith is eccentric with relation to the sleeve as a whole, a driven gear rotatably mounted upon said inner extension of said sleeve, a driven shaft extending through the bore of said sleeve and having at its inner end a head which is secured to said driven gear, a driving gear, and means to rock said sleeve to move said driven gear into and out of mesh with said driving gear.

3. In an auxiliary power device, a casing having a tubular extension, a sleeve turnably mounted within said extension, said sleeve having an eccentric bore therethrough, one end of said sleeve projecting outwardly beyond said tubular extension and the other end of the sleeve projecting inwardly therefrom to a point within said casing, the inner end of said sleeve having an extension which surrounds said bore and together therewith is eccentric with relation to the sleeve as a whole, a driven gear rotatably mounted upon said inner extension of said sleeve, a driven shaft extending through the bore of said sleeve and having at its inner end a head which is secured to said driven gear, a driving gear, a radial operating arm which projects from the portion of said sleeve that is outside of said tubular extension, said sleeve being rockable by means of said operating arm, there being a circumferential groove in said sleeve with seats in each end of said groove, a manually retractable pin mounted upon said tubular extension and having an end portion adapted to enter said seats in order releasably to hold said sleeve in either of two positions, in one of which said driven gear is in mesh with said driving gear and in the other of which said driven gear is withdrawn from engagement with said driving gear, and means to yieldingly urge said pin toward said seats.

4. In an auxiliary power device, a casing having a bearing opening through a side thereof, a sleeve turnably mounted within said bearing opening, said sleeve having an eccentric bore therethrough, one end of said sleeve projecting into said casing, that end of the sleeve having a tubular extension which surrounds said bore and together therewith is eccentric with relation to the sleeve as a whole, a driven gear rotatably mounted within said casing upon said extension of said sleeve, a driven shaft extending through said bore of said sleeve and being at its inner end secured to said driven gear, a driving gear, the axis of rotation of said driving gear extending parallel to the axis of rotation of said driven gear, a bearing for said driving gear, and means to rock the aforementioned sleeve to move said driven gear into and out of mesh with said driving gear.

In testimony whereof I hereunto affix my signature.

SAMUEL B. BROWN.